(12) United States Patent
Digiovanni et al.

(10) Patent No.: US 9,658,393 B2
(45) Date of Patent: May 23, 2017

(54) HIGH-BIREFRINGENCE HOLLOW-CORE FIBERS AND TECHNIQUES FOR MAKING SAME

(71) Applicant: OFS Fitel, LLC, Norcross, GA (US)

(72) Inventors: David J Digiovanni, Mountain Lakes, NJ (US); John M Fini, Metuchen, NJ (US); Robert S Windeler, Annandale, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/420,467

(22) PCT Filed: Mar. 15, 2013

(86) PCT No.: PCT/US2013/032652
§ 371 (c)(1),
(2) Date: Feb. 9, 2015

(87) PCT Pub. No.: WO2014/031176
PCT Pub. Date: Feb. 27, 2014

(65) Prior Publication Data
US 2015/0198764 A1 Jul. 16, 2015

Related U.S. Application Data

(60) Provisional application No. 61/684,738, filed on Aug. 18, 2012.

(51) Int. Cl.
*G02B 6/02* (2006.01)
*G02B 6/032* (2006.01)
(Continued)

(52) U.S. Cl.
CPC .......... *G02B 6/032* (2013.01); *C03B 37/0122* (2013.01); *C03B 37/01217* (2013.01);
(Continued)

(58) Field of Classification Search
CPC .... G02B 6/036; G02B 6/024; G02B 6/02309; G02B 6/02323; G02B 6/02328;
(Continued)

(56) References Cited

U.S. PATENT DOCUMENTS

2006/0088260 A1* 4/2006 Williams .......... B29D 11/00721
385/123
2006/0263022 A1* 11/2006 Han ........................ G02B 6/02
385/123
2010/0002980 A1* 1/2010 Fini .................... G02B 6/02328
385/11

* cited by examiner

*Primary Examiner* — Kaveh C Kianni
*Assistant Examiner* — Hung Lam
(74) *Attorney, Agent, or Firm* — Jacobs & Kim LLP

(57) ABSTRACT

A hollow core fiber has a cladding comprising a matrix of cells, wherein each cell comprises a hole and a wall surrounding the hole. The fiber further has a hollow core region comprising a core gap in the matrix of cells, wherein the core gap spans a plurality of cells and has a boundary defined by the interface of the core gap. The matrix of cells comprises a plurality of lattice cells, and a plurality of defect cells characterized by at least one difference in at least one property from that of the lattice cells. The cells at the core region boundary include lattice cells and defect cells that are arranged in a pattern that define two orthogonal axes of reflection symmetry, so as to produce birefringence in a light propagating through the hollow core fiber.

10 Claims, 15 Drawing Sheets

(51) Int. Cl.
  *G02B 6/036*      (2006.01)
  *C03B 37/012*     (2006.01)
  *C03B 37/027*     (2006.01)
  *G02B 6/024*      (2006.01)
(52) U.S. Cl.
  CPC .. *C03B 37/02709* (2013.01); *C03B 37/02781* (2013.01); *G02B 6/024* (2013.01); *G02B 6/02328* (2013.01); *C03B 2203/14* (2013.01); *C03B 2203/16* (2013.01); *C03B 2203/30* (2013.01); *C03B 2203/302* (2013.01); *C03B 2203/31* (2013.01); *C03B 2205/10* (2013.01); *Y02P 40/57* (2015.11)
(58) Field of Classification Search
  CPC ............ G02B 6/02347; C03B 2203/14; C03B 2203/30; C03B 37/01217; C03B 37/0122; C03B 37/02709; C03B 37/02781
  USPC .................................................. 385/11, 126
  See application file for complete search history.

HIGH-BIREFRINGENCE HOLLOW-CORE FIBERS AND TECHNIQUES FOR MAKING SAME

CROSS REFERENCE TO RELATED APPLICATION

The present application claims the priority benefit of U.S. Provisional Patent Application No. 61/684,738, filed on Aug. 18, 2012, which is owned by the assignee of the present application and which is incorporated by reference herein in its entirety.

BACKGROUND OF THE INVENTION

Field of the Invention

The present invention relates generally to optical fiber devices and methods, and in particular, to improved high-birefringence hollow-core fibers and techniques for making same.

Background Art

Hollow-core fibers allow guidance of light almost entirely in a vacuum, or in a liquid or gas filling the hollow core. This capability opens up several possibilities, such as achieving extremely low optical nonlinearities in a potentially low-loss, bend-resistant fiber. The unique properties of hollow-core fibers are potentially useful in a number of different applications, including optical transmission, sensing, pulse compression, and the like.

For example, generally speaking, a hollow-core communications fiber would display significantly less nonlinearity than a silica-core fiber, dramatically changing system performance. For sensing applications, hollow-core fibers allow light to be guided in a gas or liquid sample introduced into a core of the fiber. This tends to maximize the interaction of light with a sample, which is very desirable for high sensitivity. In high-power pulsed laser systems, a hollow core allows very high peak power pulses to be delivered and compressed without experiencing nonlinearities or damaging the fiber.

In addition, hollow-core fibers are expected to have large polarization-mode impairments. This is significant because in many applications, such as communications, control of signal polarization is important. With respect to polarization-mode dispersion, generally speaking, it is desirable for a transmission fiber to have either a very low birefringence so that transmission is polarization independent, or a very high birefringence so that the polarization of transmitted signals can be controlled.

Generally speaking, it is difficult to make a hollow-core fiber effectively single mode and have a very low birefringence. Thus, birefringent hollow-core fibers that allow signal propagation in a well-maintained polarization are an attractive alternative. Similarly, in sensing systems and other applications, unwanted polarization coupling often contributes noise or impairment to the sensor output because of the uncertain division of light into two polarization modes. Thus, the polarization-maintaining property of a birefringent fiber can keep each signal in a definite polarization mode, despite perturbations that might otherwise induce polarization-coupling.

In one current design for birefringent hollow-core fibers, a core tube is added to an assembly of lattice capillary tubes, and a number of detect rods are positioned at the inner circumference of the core tube in a non-symmetrical pattern. Birefringence has been successfully demonstrated experimentally using such a design. However, the use of a core tube is not always desirable.

One reason is that the use of a core tube impacts the core-web thickness in the drawn fiber, which has an effect on performance. Different choices of core-web thickness may be desirable for achieving low loss, large bandwidth of low-loss windows, high birefringence, or other properties. Also, the positions of the defect rods are not fixed by a close-packed arrangement of elements. Thus, the defect rods are prone to becoming displaced from their desired positions, or even to becoming unintentionally detached. Irregularity in defect positions can lead to increased loss or drifting of the birefringent axis, which tends to degrade the polarization-maintaining performance of the fiber.

SUMMARY OF THE INVENTION

These and other issues of the prior art are addressed by the present invention, aspects of which are directed to a birefringent hollow-core fiber, and a technique for fabricating the fiber.

According to an aspect of the invention, a hollow core fiber has a cladding comprising a matrix of cells, wherein each cell comprises a hole and a wall surrounding the hole. The fiber further has a hollow core region comprising a core gap in the matrix of cells, wherein the core gap spans a plurality of cells and has a boundary defined by the interface between the cells of the core gap and the cells of the cladding. The matrix of cells comprises a plurality of lattice cells, and a plurality of defect cells characterized by at least one difference in at least one property, such as a physical property or an optical property, from, that of the lattice cells. The cells at the core region boundary include lattice cells and defect cells that are arranged in a pattern that define two orthogonal axes of reflection symmetry, so as to result in birefringence in a light propagating through the hollow core fiber.

A further aspect of the invention is directed to a method for fabricating a birefringent hollow core fiber. A plurality of capillary tubes is arranged into a preform assembly. A core gap is formed in the matrix of capillary tubes, spanning a plurality of positions where capillary tubes are missing from the matrix, and having a boundary defined by the interface of the core gap with the remaining assembly. The matrix of capillary tubes comprises a plurality of lattice capillary tubes, and a plurality of defect capillary tubes characterized by at least one difference in at least one property from that of the lattice capillary tubes. The capillary tubes at the core gap boundary include lattice capillary tubes and defect capillary tubes that are arranged in a pattern that define two orthogonal axes of reflection symmetry in a hollow core fiber drawn from the preform assembly. The preform assembly is then drawn into a fiber, wherein the capillary tubes have been fused together to form a microstructured cladding surrounding a hollow core.

In an aspect of the invention, a core tube is placed in the assembly at the core gap boundary. In another aspect of the invention, no core tube is placed in the assembly at the core gap boundary.

DETAILED DESCRIPTION

Figure 1A:
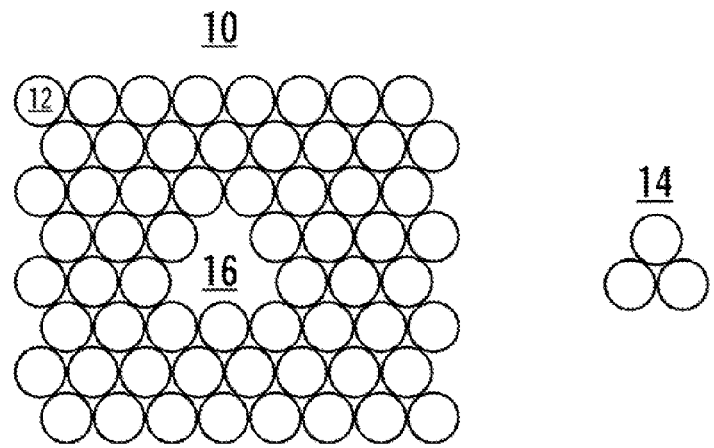
FIGS. 1A-1F are a series of cross section diagrams of representative portions of exemplary preform assemblies, illustrating the relationship between local core geometry and birefringence.

There are now described examples, in accordance with aspects of the invention, of polarization-maintaining hollow-core fibers and techniques for designing and constructing those fibers.

The discussion is organized as follows:
1. Introduction—Birefringence and Core Geometry
2. Birefringent Hollow-Core Fibers
3. Non-Symmetrical Core Geometries
4. Solid Defect Rods
5. Defect Cells and Defect Capillary Tubes
5.1 Example—13-Cell Preform Assembly
5.2 Other Examples—3-Cell, 7-Cell, and 4-Cell Preform Assemblies
5.3 Numerical Simulations
5.4 Numerical Simulations; Example—19-Cell Core
5.5 Further Techniques and Examples
  5.51 Oblong Core
  5.52 Core and Defect Patterns
  5.53 Ranges of Defect "Strength"
6. Other Designs
7. Experimental Confirmation
8. General Technique
9. Conclusion 1. Introduction—Birefrigence and Core Geometry A fiber is polarization-maintaining if it has intentional birefringence large enough to mitigate the impact of uncontrolled polarization coupling, especially length-varying or time-varying polarization coupling. For example, a polarization-maintaining fiber might have an output polarization in a particular system that is largely independent of changes in bends, temperature, etc., as long as the input polarization is chosen correctly.

As a practical matter, all actual hollow-core fibers have some birefringence, since no physical structure is perfectly symmetrical. The goal of a polarization-maintaining or high-birefringence fiber is to achieve a relatively large birefringence with relatively little variation along fiber length. Preferably, the local birefringent axis at each point in the fiber should be determined primarily by the structure of the preform, or preform assembly, from which the fiber is drawn, rather than being introduced during the draw process. Establishing the local birefringent axis at the preform stage reduces the likelihood that draw conditions could introduce significant randomness or variation in the birefringent axis along the length of the fiber.

A mode guided in a hollow core of a fiber can be made birefringent if the local geometry around the core does not display n-fold symmetry for n>2. For the purposes of the present discussion, such a geometry is referred to as "non-symmetrical," or having "non-symmetry," irrespective of other types of symmetry that may be present. Similarly, as used herein, the terms "symmetry" and "symmetrical" refer only to geometries that have an n-fold symmetry for n>2, again irrespective of other types of symmetry that may be present. Thus, using these definitions, structures that have reflection symmetry or 180-degree rotational symmetry are nonetheless considered to be "non-symmetrical."

Birefringence depends much more strongly on the local geometry immediately around a core than on non-local geometry. Thus, a core and its surrounding local structures may display the described symmetry, even if more distant structures within the fiber are non-symmetrical, or if the core itself is not symmetrically positioned within the fiber. Further, in a fiber with multiple cores, the birefringence of each core can be estimated from the local geometry around that core.

2. Birefringent Hollow-Core Fibers

Birefringence is now discussed with respect to optical fibers in which a hollow core is surrounded by a microstructured cladding comprising a web of cell walls defining a plurality of individual hollow cells. Such fibers may be manufactured, for example, using a "stack-and-draw" technique, in which a plurality of capillary tubes, fabricated from silica glass, plastic, or the like, are suitably arranged to create a preform assembly. The preform assembly typically includes as outer tube of like material for holding together the plurality of capillary tubes. After construction, the preform assembly is then drawn into optical fiber.

The drawing process causes the plurality of capillary tubes in the preform assembly to fuse together into the above-mentioned microstructured web of individual hollow cells. Hollow cells in the microstructure of the drawn fiber correspond to capillary tubes in the preform assembly. A hollow core or other feature can be produced, for example, by: omitting capillary tubes from the preform assembly; adding other components into the preform assembly; selecting suitable parameters for the drawing of the preform assembly into optical fiber; or other suitable techniques or combination thereof.

A number of different approaches can be used to provide birefringence in a hollow core fiber: (1) designing the shape of the core boundary such that it is "non-symmetrical" as defined herein; (2) introducing suitably positioned optical defect rods near the core; (3) providing suitably configured and positioned "defect cells" in the fiber microstructure; (4) some combination of any of approaches (1), (2), or (3) with each other or with other approaches.

3. Non-Symmetrical Core Geometries

Figure 1B:
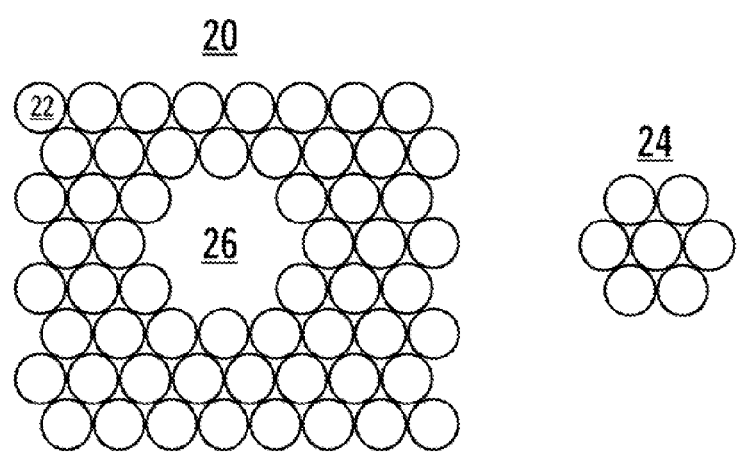
Figure 1C:
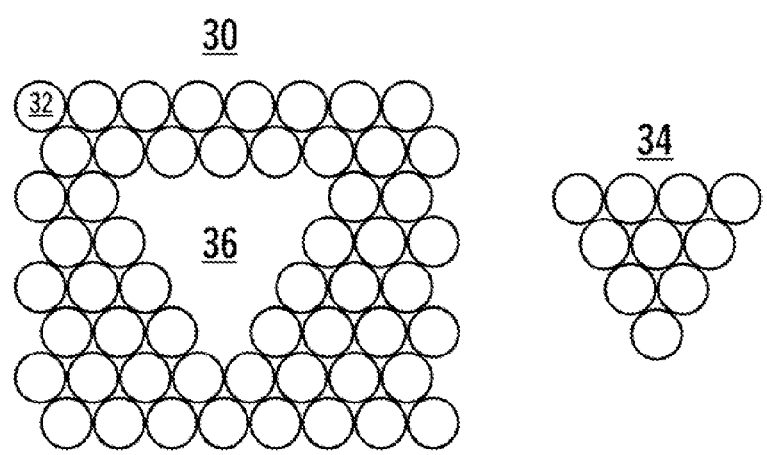
Figure 1D:
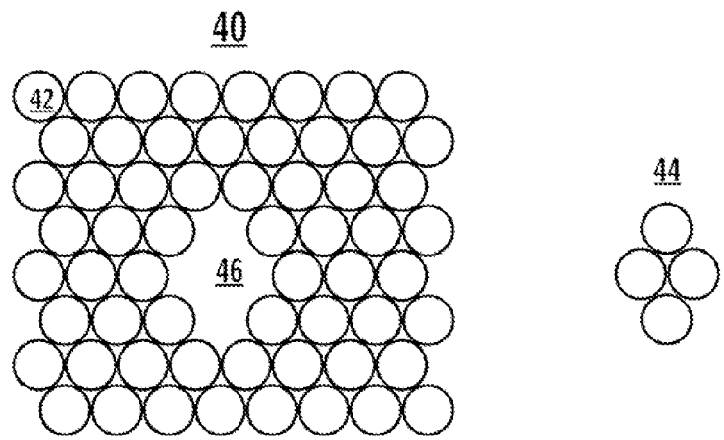
Figure 1E:
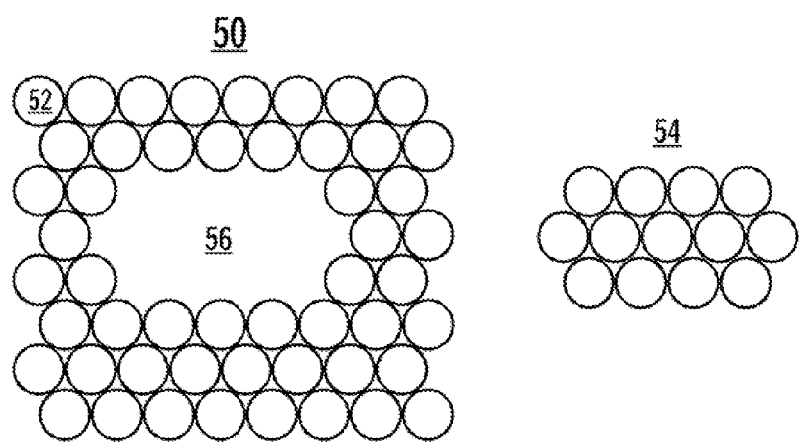
Figure 1F:
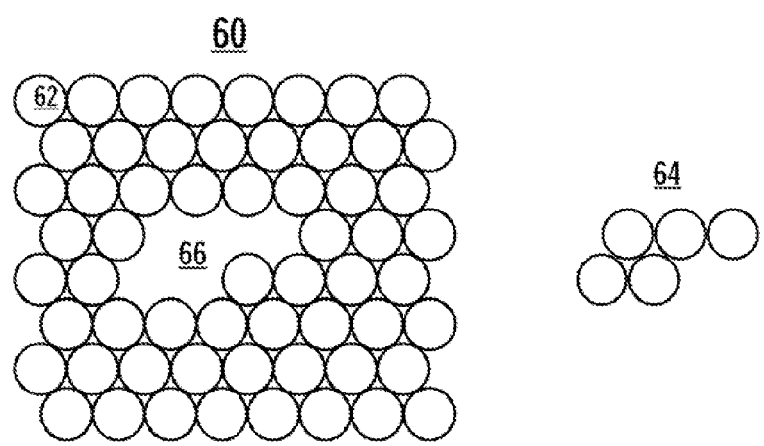

FIGS. 1A-1F are diagrams of a series of representative portions of preform assemblies, in which a contiguous group of capillary tubes has been omitted. FIGS. 1A-1C show preform assemblies in which a contiguous group of missing capillary tubes and the resulting core gap are symmetrical. In order for fibers drawn from these preforms to display birefringence, typically it will be necessary to do so during the drawing process. FIGS. 1D-1F show preform assemblies in which the contiguous group of missing capillary tubes and the resulting core gap are non-symmetrical, therefore fibers drawn from such preforms will have non-symmetrical cores with birefringent surface modes, even in the absence of birefringence-supporting draw conditions.

For the purposes of the present discussion, preform assemblies and hollow core fibers are classified according to the number of capillary tubes, or cells, that are omitted to form a given hollow core region. Each of FIGS. 1A-1F includes a depiction of each respective group of omitted capillary tubes.

FIG. 1A shows a cross section of the core region and surrounding local geometry of a 3-cell preform assembly 10, in which a plurality of capillary tubes 12 have been assembled into a regular arrangement, from which a symmetrical contiguous group of three capillary tubes 14 has been omitted to form a correspondingly shaped symmetrical core gap 16. It will be appreciated that the depiction of omitted groups of capillary tubes, such as omitted group 14, is for the purposes of illustration.

FIG. 1B shows across section of the core region and surrounding local geometry of a 7-cell preform assembly 20, in which a plurality of capillary tubes 22 have been assembled into a regular arrangement, from which a symmetrical contiguous group of seven capillary tubes 24 has been omitted to form a correspondingly shaped symmetrical core gap 26.

FIG. 1C shows a cross section of the core region and surrounding local geometry of a 10-cell preform assembly 30, in which a plurality of capillary tubes 32 have been assembled into a regular arrangement, from which a symmetrical contiguous group often capillary tubes 34 has been omitted to form a correspondingly shaped symmetrical core gap 36.

FIG. 1D shows a cross section of the core region and surrounding local geometry of a 4-cell preform assembly 40, in which a plurality of capillary tubes 42 have been assembled into a regular 4-cell arrangement, in which a non-symmetrical contiguous group of four capillary tubes 44 has been omitted to form a correspondingly shaped non-symmetrical core gap 46.

FIG. 1E shows a cross section of the core region and surrounding local geometry of a 13-cell preform assembly 50, in which a plurality of capillary tubes 52 have been assembled into a regular 13-cell arrangement, in which a non-symmetrical contiguous group of thirteen capillary tubes 54 has been omitted to form a correspondingly shaped non-symmetrical core gap 56.

FIG. 1F shows a cross section of the core region and surrounding local geometry of a 5-cell preform assembly 60, in which a plurality of capillary tubes 62 have been assembled into a regular 5-cell arrangement, in which a non-symmetrical contiguous group of five capillary tubes 64 has been omitted to form a correspondingly shaped non-symmetrical core gap 66.

The use of non-symmetrical assemblies, such as those illustrated in FIGS. 1D-1F, would be expected to yield fibers with improved polarization-maintaining properties. As mentioned above, it is generally preferable for non-symmetries to be introduced at the preform stage, rather than during the drawing process.

Further, non-symmetrical preform assemblies having two orthogonal axes of reflection symmetry are preferable, since the axes of reflection symmetry will define axes of birefringence that are at least somewhat independent of draw conditions. Thus, for example, generally speaking, the geometries shown in FIGS. 1D and 1E are preferable to the geometry shown in FIG. 1F, since they display reflection symmetry around their respective horizontal and vertical axes, as depicted on the page.

4. Solid Defect Rods

Figure 2A:
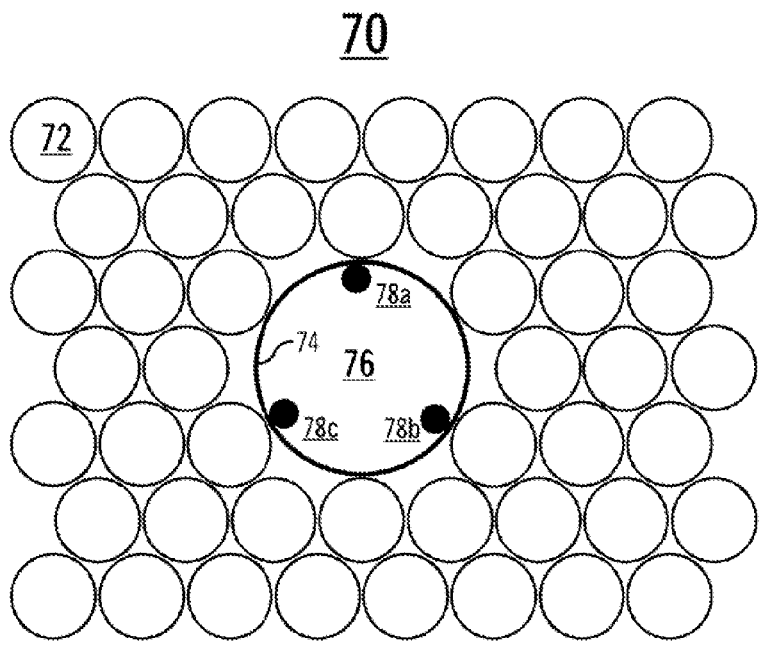
FIGS. 2A-2B are a pair of cross section diagrams of representative portions of exemplary preform assemblies, illustrating the relationship between defect rod placement and birefringence.
Figure 2B:
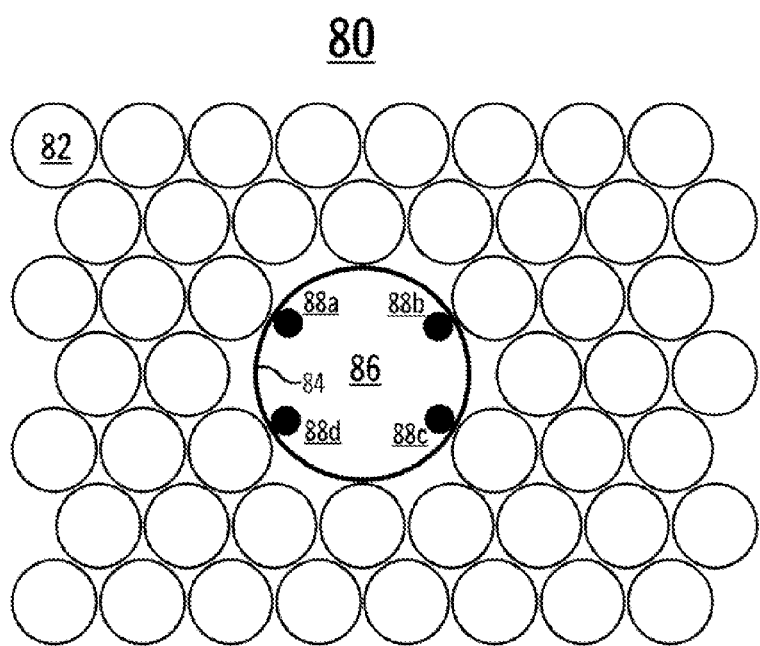

As mentioned above, in a second approach, defect rods attached to the inner surface of a core tube are used to provide birefringence in a hollow-core fiber. FIGS. 2A and 2B are cross section diagrams of representative portions of first and second 7-cell preform assemblies 70 and 80, in which a plurality of capillary tubes 72 and 82 have been assembled into a regular arrangement, from which there has been omitted a symmetrical contiguous group of seven capillary tubes, resulting in a correspondingly shaped core gap 76 and 86. A core tube 74 and 84 is fitted into the core gap 76 and 86.

In FIG. 2A, three defect rods 78a, 78b, and 78c are positioned symmetrically at the inner circumference of the core tube 74. In FIG. 2B, four defect rods 88a, 88b, 88c, and 88d are positioned non-symmetrically at the inner circumference of the core tube 84. The non-symmetrical positioning of the defect rods 88a-d in the FIG. 2B preform assembly 80 provides significant birefringence in a hollow-core fiber drawn from the preform assembly 80. This birefringence is not provided by the symmetrical positioning of the defect rods 78a-c in the preform assembly 70 shown in FIG. 2A.

While the structure of FIG. 2B has been demonstrated to result in birefringence in a fabricated fiber, it has certain disadvantages:

First, as depicted, this approach requires that a core tube be placed in the assembly, increasing the thickness of the web of cell walls immediately surrounding the core of the fiber, referred to herein as "core webs." Studies have shown that thinner core webs may be desirable in some cases for reducing the presence of undesirable surface modes or providing a large bandwidth of low-loss regions. Thus a core tube may be desirable in some cases and not others, and it is desirable to be able to control the asymmetry of the fiber independent of the presence or thickness of the core tube.

Second, the defect rods attached to the core tube are not part of a close-packed arrangement, adding difficulty to the fabrication process and tending to result in a less precise final structure.

5. Defect Cells and Defect Capillary Tubes

As mentioned above, a microstructured hollow-core fiber typically comprises a web of cell walls that define individual hollow cells extending along the length of the fiber. According to an aspect of the invention, birefringence is created by providing a microstructure comprising two different types of cells: "lattice cells" and "defect cells."

As used herein, the term "lattice cells" refers to the cells that form the basic building blocks of a fiber microstructure. Lattice cells typically have substantially similar sizes, shapes, wall thicknesses, and optical properties.

As used herein, the term "defect cells" refer to cells in a fiber microstructure that have a size and shape that are generally similar to the size and shape of the lattice cells, but that have at least one birefringence-supporting difference in optical or physical properties. As described below, in one practice of the invention, the difference in property is a difference in wall thickness, i.e., greater or smaller. According to further practices of the invention, other differences in property am used, including a greater or lesser refractive index, a greater or lesser viscosity, a different shape (e.g. hexagonal vs circular), and the like.

According to an aspect of the invention, birefringence is created in a hollow core fiber by providing a suitable arrangement of defect cells and lattice cells at a suitably shaped hollow core boundary. As described below, birefringent surface properties can be produced by suitably configuring: (1) the shape of the hollow core boundary, and (2) the arrangement of defect cells and lattice cells in the layer of cells at the boundary of the hollow core (herein referred to as "boundary cells").

As mentioned above, it has been found that variations in the properties of the cells not positioned at the hollow core i.e., those cells (herein referred to as "non-boundary cells") that, from the point of view of the hollow core, are "obscured" by the boundary cells, do not have a significant impact on the surface mode properties created by the boundary cells. Thus, the described invention may be practiced with "non-boundary" cells, some or all of which have properties that are not identical to those of the lattice cells at the core boundary.

In certain situations, the designation of a group of cells as "lattice cells" or "defect cells" can be somewhat arbitrary. It is anticipated that in typical use, the majority of boundary cells, and most or all of the non-boundary cells will have substantially identical properties and can therefore be designated as "lattice cells," with a second, small group of distinct cells being designated as "defect cells." However, given, that variations in the properties of non-boundary cells generally have little effect on the birefringence created by the boundary cells, it would be possible to fabricate a fiber in which it is not readily apparent which group of cells provides the described "lattice cells," and which group of cells provides the "defect cells." It will be appreciated that it is possible to practice the invention without regard to the respective classification of first and second groups of cells within a given plurality of cells as: "lattice cells" and "defect cells," or as "defect cells" and lattice cells."

According to an aspect of the invention, one way to create the described birefringent cell and core geometry is to use a "stack-and-draw" technique, or the like, to draw a hollow core fiber from a preform assembly comprising a plurality of capillary tubes having a core gap therein corresponding to the fiber's hollow core. The core gap may suitably be formed through the omission of a contiguous group of capillary tubes.

The preform assembly includes, at the core gap boundary, lattice capillary tubes and defect capillary tubes corresponding to lattice cells and defect cells at the hollow core boundary in the drawn fiber. The lattice capillary tubes and defect capillary tubes in the preform assembly are arranged according to a configuration that translates into a birefringent configuration of lattice cells and detect cells in the drawn fiber.

It should be noted that it is believed that the drawn fiber contains structures that are themselves novel, irrespective of the particular technique used to fabricate the fiber.

As used herein, the term "lattice capillary tube" refers to a capillary tube in a preform assembly corresponding to a "lattice cell" in a fiber drawn from the preform assembly. The term "defect capillary tube" refers to a capillary tube in a preform assembly corresponding to a "defect cell" in the drawn fiber.

Defect capillary tubes are characterized by at least one birefringence-supporting difference in optical or physical properties from those of the lattice capillary tubes. Similar to defect cells, discussed above, defect capillary tubes can be characterized by, for example, a difference in wall thickness, refractive index, viscosity, or the like, or some combination thereof.

Figure 3A:
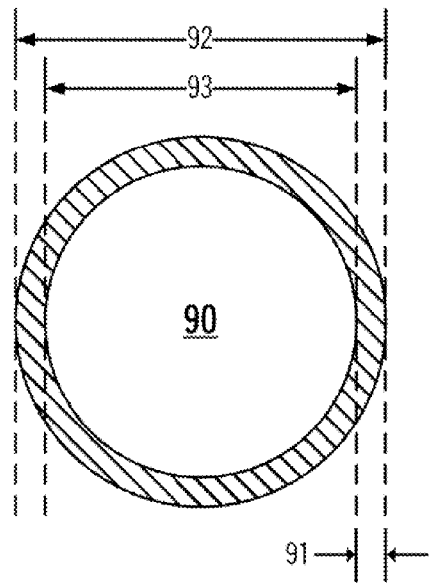
FIGS. 3A-3C are a series of cross section diagrams, not drawn to scale, providing a comparison of the respective geometries of an exemplary lattice capillary tube (FIG. 3A) and two exemplary defect capillary tubes (FIGS. 3B and 3C).
Figure 3B:
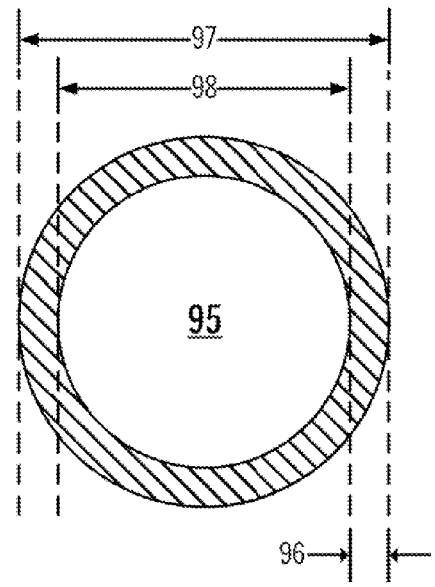
Figure 3C:
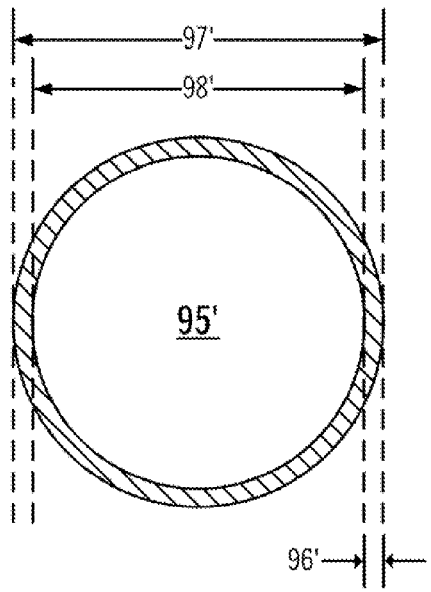

FIGS. 3A-3C are a series of cross section diagrams, not drawn to scale, providing a comparative illustration of an exemplary lattice capillary tube 90, shown in 3A, and two exemplary defect capillary tubes 95 and 95', shown respectively in 3B and 3C.

As shown in FIGS. 3A and 3B, exemplary lattice tube 90 and defect tube 95 have respective wall thicknesses 91, 96 outer diameters 92, 97 and inner diameters 93, 98. The defect tube has a wall thickness 96 that is greater than the lattice tube wall thickness 91. According to an aspect of the invention, the defect tube outer diameter 97 is the same as the lattice tube outer diameter 92. Because of the difference in wall thickness, the defect tube 95 has an inner diameter 98 that is correspondingly smaller than the lattice tube inner diameter 93.

Using defect capillary tubes and lattice capillary tubes with the same outer diameter allows a close-packed assembly according to the present invention to be easily fabricated using methods similar to those used to construct simpler structures, such as those shown in FIGS. 1A-1F, discussed above. This close-packed structure helps to minimize unintentional irregularities introduced in the assembly or the fiber, in contrast with non-close-packed structures. It is noted that it is possible to practice the described techniques using a close-packed geometry employing defect capillary tubes and lattice capillary tubes having different outer diameters.

FIG. 3G shows an exemplary defect tube 95', which has a wall thickness 96' that is smaller than, that the lattice tube wall thickness 91. Defect tube 95' has an outer diameter 97' that is the same as the lattice tube outer diameter 92, and a correspondingly larger inner diameter 98'.

There are now described: (1) examples of improved preform assemblies according to aspects of the invention; (2) results of numerical simulations, and trends emerging therefrom; and (3) experimental confirmation of the numerical simulations.

5.1 Example—13-Cell Preform Assembly

Figure 4:
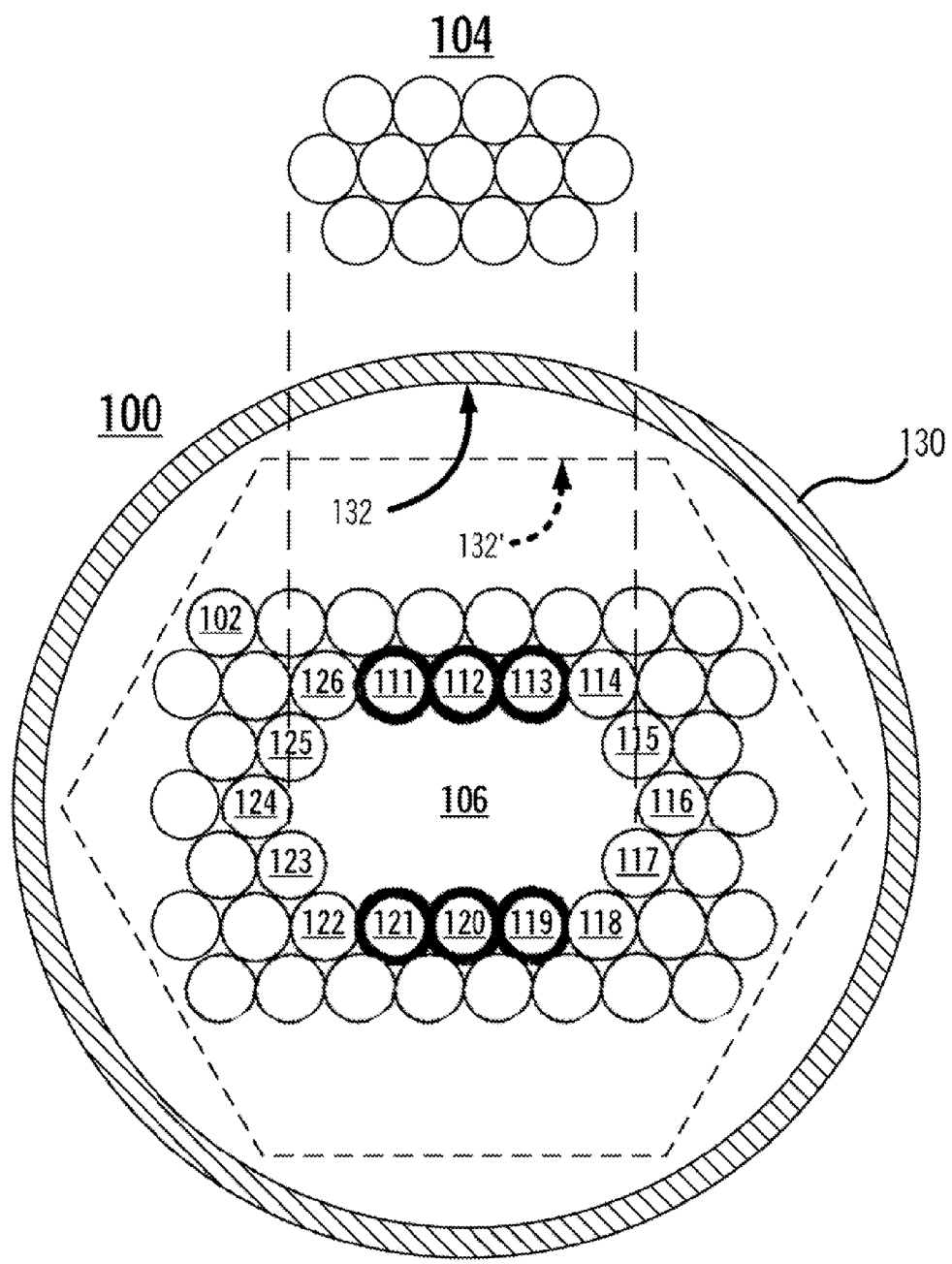
FIG. 4 is a cross section view of a representative portion of an exemplary preform assembly according to an aspect of the invention.
Figure 5:
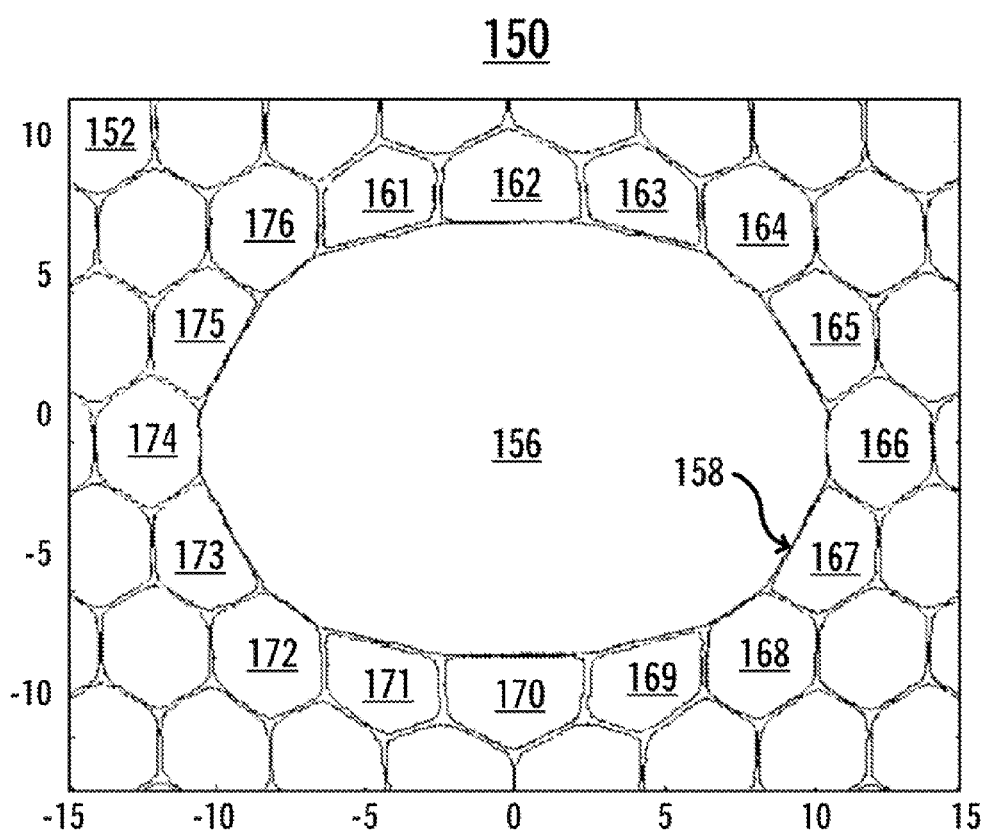
FIG. 5 is a cross section view of a representative portion of a hollow-core fiber drawn from the preform assembly shown in FIG. 4.

FIG. 4 is a transverse cross section view of a representative portion of a first, computer-generated example of a 13-cell preform assembly 100 according to an aspect of the invention, and FIG. 5 is a transverse cross section view of a corresponding portion of an exemplary hollow-core fiber 150 drawn from the preform assembly 100 shown in FIG. 4.

Preform assembly 100 comprises a close-packed stack of lattice capillary tubes 102, from which a selected group of contiguous capillary tubes 104 has been omitted to form a core gap 106. In the present example, the omitted group 104 comprises 13 contiguous capillary tubes 102. It should be that the present example is illustrative rather than limiting. As illustrated by the other examples provided herein, and as will be apparent from the present description, it is possible to practice the present invention with preform assemblies having core gaps with different shapes and sizes.

This general arrangement can give rise to many different fiber geometries, in part specified by the details of the assembly geometry, but also dependent on draw conditions.

FIG. 4 further shows an outer tube 130, not drawn to scale, that is used to house the close-packed stack of capillary tubes 102, and to provide a structure for holding the stack of capillary tubes 102 together. According to a practice of the invention, the arrangement of capillary tubes 102 includes additional capillary tubes (not shown), which allow the stack to be held together by the inner surface 132 of the outer tube 130. In FIG. 4, the outer tube's inner surface 132 is depicted as having a circular profile. According to a further practice of the invention, the inner surface of the outer tube may have a profile with a different shape, such as hexagonal (shown by 132'), or the like. In one practice of the invention, in order to facilitate the positioning of the capillary tubes 102 within outer tube 130, the capillary tubes 102 have a length that is greater than that of the outer tube 130. It should be noted that other suitable techniques may be used to hold the stack of capillary tubes 102 together.

In the present example, capillary tubes 111-113 and 119-121 are defect capillary tubes, and capillary tubes 114-118 and 122-126 are lattice capillary tubes. It will be seen in FIG. 4 that the core gap in the preform assembly is non-symmetrical, i.e., the core gap does not have n-fold rotational symmetry for n>2. It will further be seen in FIG. 4 that, in addition, defect capillary tubes 111-113 and 119-121 are positioned non-symmetrically.

For illustrative purposes, in FIG. 4 defect capillary tubes 111-113 and 119-121 are depicted as having being several times thicker than lattice capillary tubes 110, 114-118, and 122-126 so that they can be visibly identified in the diagram. However, the difference in wall thickness is typically much less. Also, defect capillary tubes may have a wall thickness that is less than that of the lattice capillary tubes. Criteria for selecting suitable respective wall thicknesses for lattice capillary tubes and defect capillary tubes are described in detail below.

FIG. 5 shows a cross section of a representative portion of an exemplary hollow-core fiber 150 drawn from assembly 100. It should be noted as a general matter that a givers preform assembly geometry can give rise to different fiber geometries, depending upon draw conditions and other factors.

As a result of the drawing process, the capillary tubes have fused together to form a microstructured cladding having a web structure. Individual cells and cell walls in the microstructure correspond to individual capillary tubes and tube walls in the preform assembly. In fiber 150, the microstructured cladding surrounds a hollow core 156 having a relative size, shape, and position that are determined, in part, by the relative size, shape, and position of the core gap 106 in the preform assembly 100. Defect cells 161-163 and 169-171 correspond, respectively, to defect capillary tubes 111-113 and 119-121. Lattice cells 164-168 and 172-176 correspond, respectively, to lattice capillary tubes 114-118 and 122-126. Fiber geometry will additionally be determined by draw conditions and other fabrication methods, including methods for controlling pressure in holes during different stages of fabrication. Accordingly, defect capillaries may be handled differently during fabrication in order to change the corresponding cells of the fiber; for example, pressure control of defect cells may be different from lattice cells during draw, in order to enlarge or reduce the holes in the corresponding fiber defect cells.

5.2 Other Examples—3-Cell, 7-Cell, and 4-Cell Preform Assemblies

Figure 6A:
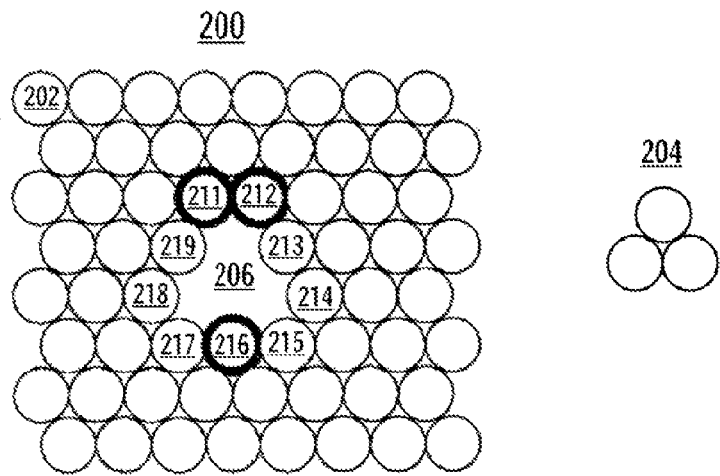
FIGS. 6A-6C show cross section diagrams of exemplary preform assemblies according to further aspects of the invention.
Figure 6B:
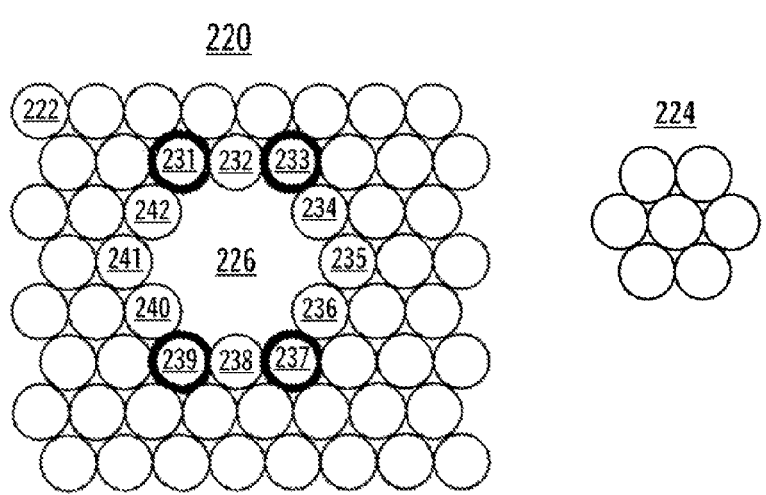
Figure 6C:
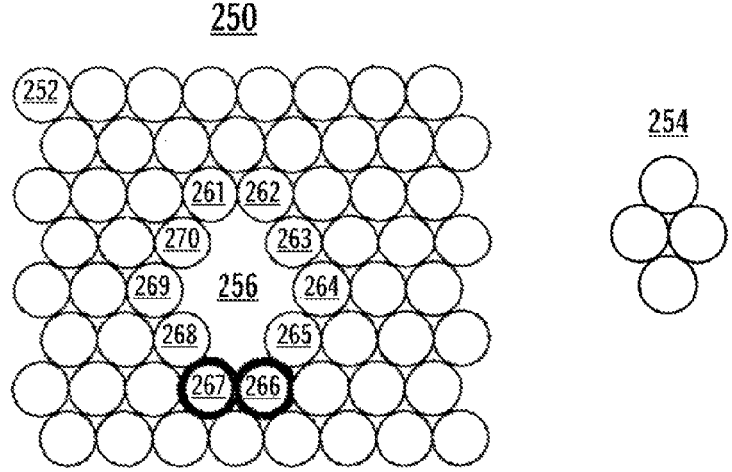

FIGS. 6A-6C show other examples of preform assemblies according to the present invention.

FIG. 6A shows a 3-cell preform assembly 200 having a symmetrical core gap, and having reflection symmetry. Birefringence is created through the non-symmetrical positioning of three defect capillary tubes at the core gap boundary.

FIG. 6B shows a 7-cell preform assembly 220 having a symmetrical core gap, and having reflection symmetry. Birefringence is created through the non-symmetrical positioning of four defect capillary tubes at the core gap boundary.

FIG. 6C shows a 4-cell preform assembly 240, having a non-symmetrical core gap, and having reflection symmetry. Birefringence is created through the non-symmetrical geometry of the core gap and through the non-symmetrical positioning of two defect capillary tubes at the core gap boundary.

Thus, defect capillary tubes used to produce a non-symmetry about an otherwise symmetrical core, as in the 3-cell and 7-cell examples shown respectively in FIGS. 6A and 6B, discussed above, or can be used with an already non-symmetrical core shape. The defect tube placement can preserve the x- and y-axis reflection symmetry of a core, as in the 13-cell example shown in FIG. 3, or preserve only one of the reflection symmetries, as in the 4-cell example shown in FIG. 6C.

5.3 Numerical Simulations

Several hollow-core fiber geometries that might result from preform assemblies incorporating defect capillary tubes were simulated. This use of defect capillary tubes can give rise to many different fiber geometries, in part specified by the details of the assembly geometry, but also dependent on draw conditions.

Simulations were conducted, in which the wall thickness of defect capillary tubes in a preform assembly was varied to be more and less like a preform assembly without defect capillary tubes, and in which the position of defect capillary tubes in a preform assembly was varied to approximate more or less closely a symmetrical geometry.

Several trends emerged from these simulations:

1. As the wall thickness of the defect capillary tubes varies, the surface modes shift through the bandgap, and the density of the hollow core surface modes changes.

2. Birefringence of the fundamental mode tends to increase with the density of surface modes.

3. Large changes in loss, birefringence, and the like, are associated with surface modes. Higher surface-mode density thus implies more variation of loss, birefringence, and the like, within a given bandwidth.

4. A desirable range of tube thicknesses is suggested by a compromise between high birefringence, low loss, low fraction of light in the glass, and the desire to have a relatively smooth variation of these parameters within some operating bandwidth.

5. Even for applications where the signal bandwidth is extremely narrow, a reasonably large operating bandwidth is highly desirable, since this implies less sensitivity to fabrication imperfections and perturbations, for example, variations in the fiber's outer diameter.

6. The placement of defects in different positions around the core leads to different tradeoffs between birefringence, loss, and operating bandwidth. Thus, an aspect of the invention includes selecting a pattern for the lattice capillary tubes and the defect capillary tubes at the core gap boundary that provides an optimal tradeoff between birefringence, loss and bandwidth.

5.4 Numerical Simulation—Illustrative Example: 19-Cell Core

Figure 7A:
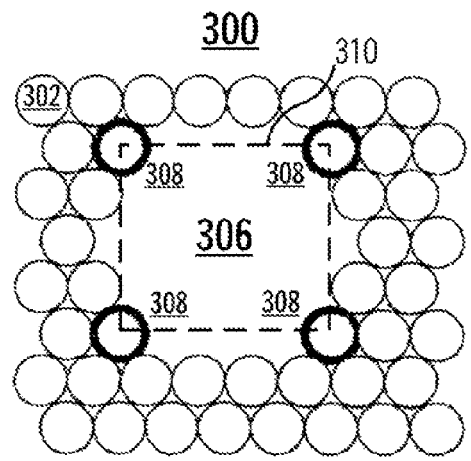
FIGS. 7A-7C are a series of cross section diagrams of 19-cell preform assemblies, with varying placements of four defect capillary tubes within the layer of capillary tubes at the respective core gap boundary of each preform assembly.
Figure 7B:
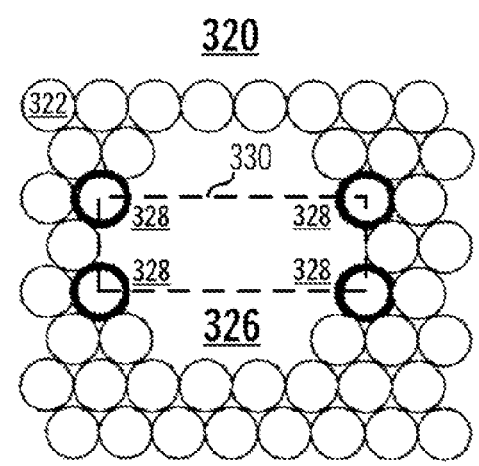
Figure 7C:
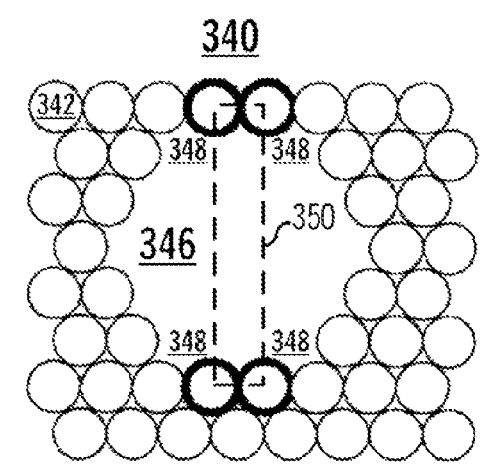

The above trends are illustrated in FIGS. 7A-7C, which show three different configurations of a 19-cell preform assembly, in which a set of four defect capillary tubes are positioned at the core gap boundary.

In FIG. 7A, preform assembly 300 is constructed from capillary tubes 302. Four defect capillary tubes 308 are arranged along the boundary of the hollow core region 306 such that they form the vertices of a rectangle 310 in which the ratio of width to height is approximately 1.2 to 1.

In FIG. 7B, preform, assembly 320 is constructed from capillary tubes 322. Four defect capillary tubes 328 are arranged along the boundary of the hollow core region 326 such that they form the vertices of a rectangle 330 in which the ratio of width to height is approximately 2.9 to 1.

In FIG. 7C, preform assembly 340 is constructed from capillary tubes 342. Four defect capillary tubes 348 are arranged along the boundary of the hollow core region 346 such that they form the vertices of a rectangle 350 in which the ratio of height to width is approximately 5.2 to 1.

From simulations, it has been determined that the defect tube placement in FIG. 7A is ineffective for producing birefringence compared with the defect tube placements shown in FIGS. 7B and 7C. The arrangement of FIG. 7A leads to very low birefringence, and is thus undersirable, while the arrangements of FIGS. 7B and 7C provide relatively good tradeoffs between birefringence, loss and bandwidth. A likely reason that the FIG. 7A preform assembly produces significantly less birefringence than the other assemblies is that the defect positions in FIG. 7A roughly approximate a four-fold rotationally symmetric set, i.e., a square.

Numerical simulations were further used, to find a range of suitable wall thicknesses of defect capillary tubes relative to that of lattice capillary tubes. The range of suitable thicknesses depends in part on bandwidth, loss, and other requirements for a particular application. Simulations indicate a favorable range of thicknesses for silica glass, or like optical material, where large birefringence is achieved and where operating bandwidth is reasonably large:

$$\frac{(1 - AFF_{detect})}{(1 - AFF_{lattice})} = 1.1 \text{ to } 2.0$$

where AFF is the "air-filling fraction," i.e., the proportion, by volume, of air to optical material in a unit cell. Thus, $AFF_{defect}$ and $AFF_{lattice}$ are the respective proportions, by volume, of air to optical material in a defect cell and in a lattice cell. Thus, defect capillary tubes having a wall thickness that is 1.1 to 2.0 times thicker than the wall thickness of the lattice capillary tubes are desirable to ultimately achieve large birefringence.

There is also a favorable range of thicknesses for defect capillary tubes having a wall thickness that is thinner than that of the lattice capillary tubes:

$$\frac{(1 - AFF_{detect})}{(1 - AFF_{lattice})} = 0.5 \text{ to } 0.9$$

For defect capillary tubes having a wall thickness that is greater than that of the lattice capillary tubes, numerical simulations indicate that the following range is particularly favorable:

$$\frac{(1 - AFF_{detect})}{(1 - AFF_{lattice})} = 1.2 \text{ to } 1.5$$

To illustrate the performance of fibers made according to this disclosure, three fiber geometries were simulated according to the 13-cell arrangement shown in FIG. 4, discussed above, but with, three different relative thicknesses for the defect capillary tubes compared to the thickness of the lattice capillary tubes:

$$\text{Simulation 1: } \frac{(1 - AFF_{detect})}{(1 - AFF_{lattice})} = 1.28$$

$$\text{Simulation 2: } \frac{(1 - AFF_{detect})}{(1 - AFF_{lattice})} = 1.56$$

$$\text{Simulation 3: } \frac{(1 - AFF_{detect})}{(1 - AFF_{lattice})} = 1.83$$

The fiber cross section shown in FIG. 4, discussed above, is based on Simulation 3.

Figure 8A:
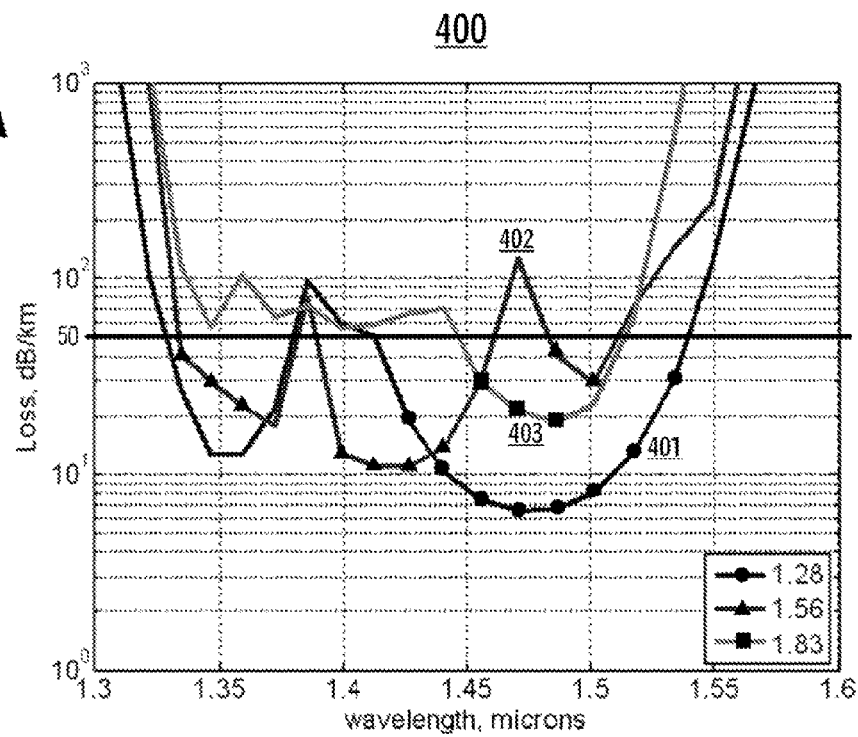
FIG. 8A is a graph illustrating the respective relationships between loss and wavelength for three different defect tube wall thicknesses.
Figure 8B:
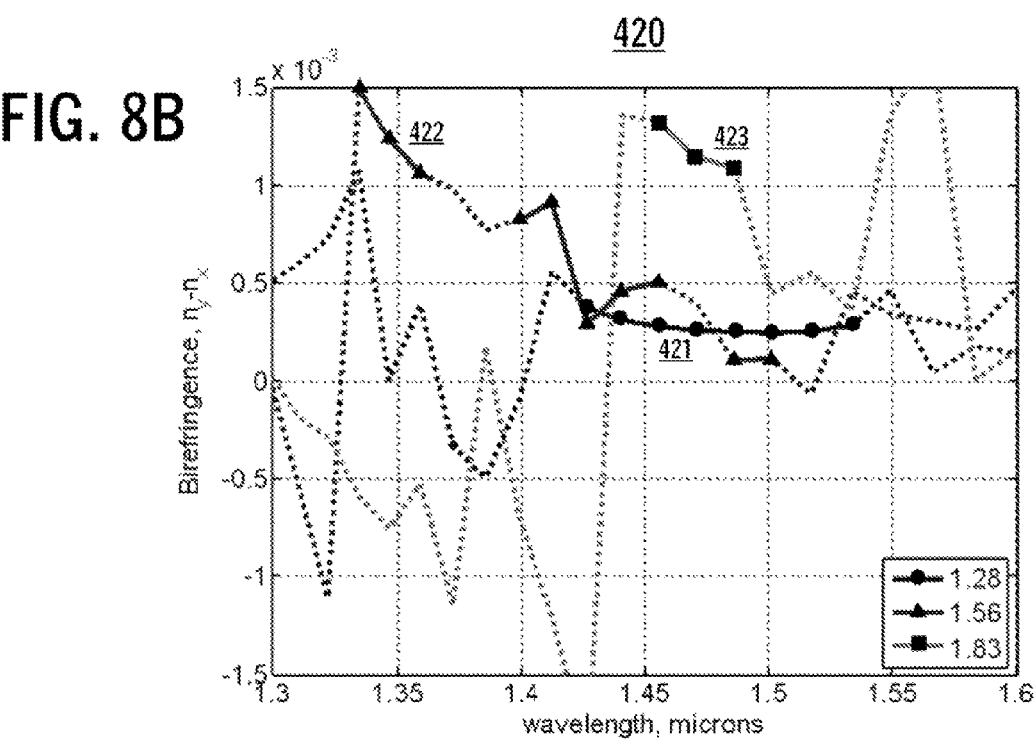
FIG. 8B is a graph illustrating the respective relationships between birefringence and wavelength for the three defect tube wall thicknesses.

FIG. 8A is a graph 400 showing the respective relationships between loss (dB/km) and wavelength (μm) for Simulation 1 (trace 401), Simulation 2 (trace 402) and Simulation 3 (trace 403). FIG. 8B is a graph 420 showing the respective relationships between birefringence and wavelength for the three simulations (traces 421-423). Birefringence is plotted with solid lines to indicate low-loss wavelength ranges, i.e., those wavelength ranges having loss below 50 dB/km, and a relatively constant birefringence. In traces 421-423, high-loss wavelength ranges are indicated with broken lines. The useful bandwidth of each fiber can be taken as the range of wavelengths with low loss.

As shown in FIGS. 8A and 8B, Simulation 1 (traces 401 and 421) achieves fairly large, relatively constant birefringence as well as low loss over a relatively large bandwidth, i.e., approximately 100 nm. Simulation 2 (traces 402 and 422) and Simulation 3 (traces 403 and 423) use defect capillary tubes with even larger wall thicknesses, yielding larger birefringence at particular wavelengths. However, Simulations 2 and 3 also display higher losses, smaller bandwidth, and much less smooth variation of optical parameters. Simulations 1, 2, and 3 illustrate a point also seen in other simulations, i.e., that for defect tube wall thicknesses greater than about two times the lattice tube wall thickness, surface density becomes large enough to cause behavior undesirable for many applications.

5.5 Further Techniques and Examples

There are now presented additional techniques and examples with respect to hollow-core fibers comprising pluralities of lattice cells and defect cells that are configured to create birefringent core geometries. In particular, the following exemplary designs have been found to result in surface mode densities that balance birefringence, low-loss, and operational bandwidth.

5.51 Oblong Core

It has been round that birefringence-supporting configurations for hollow-core fibers and preform assemblies may include a hollow core having a generally oblong shape, i.e., a shape generally approximating that of an elongated circle, having orthogonal long and short axes, opposite long sides and short sides, and reflection symmetry around each of the long axis and the short axis.

As mentioned above, it is believed that the drawn fiber itself contains novel structures, independently of the technique used to fabricate the fiber. Thus, irrespective of fabrication technique, a birefringent hollow-core fiber according to an aspect of the invention includes a microstructured cladding comprising a matrix of cells, each cell-comprising a hole and a wall surrounding the hole. The fiber farther includes an oblong-shaped hollow core region comprising a core gap in the matrix of cells, wherein the core gap spans a plurality of cells and has a boundary defined by the walls of the cells abutting the core gap. The matrix of cells comprises a plurality of lattice cells and a plurality of defect cells at the core region boundary, arranged in a pattern of lattice cells and defect cells that define two orthogonal axes of reflection symmetry, so as to produce birefringence in a light propagating through the hollow core fiber.

An alternative characterization of a hollow core fiber according to an aspect of the invention takes the fabrication technique into account. Thus, an aspect of the invention is directed to the fiber that is drawn from a from a preform assembly comprising a plurality of capillary tubes that are stacked into a regular lattice and then are fused together to form respective cells in the drawn fiber. The preform assembly includes a core gap corresponding to the hollow core of the drawn fiber. The core gap is formed from the omission of an oblong pattern of contiguous capillary tubes from the lattice and spans a plurality of capillary tubes. The preform assembly further includes, at the core gap boundary, a plurality of lattice capillary tubes and two or more defect capillary tubes. The pattern of core cells and defect cells define two orthogonal axes of reflection symmetry.

5.52 Exemplary Core and Defect Patterns

There are now described a number of exemplary core and defect patterns. In these examples, the preform assembly comprises a plurality of capillary tubes that are arranged in a closely packed stack. A core gap is created through the omission of a set of contiguous capillary tubes. Birefringence in the drawn fiber is created by providing, at the first "layer" of capillary tubes at the boundary of the core gap, a birefringence-supporting pattern of lattice capillary tubes and defect capillary tubes.

In the depicted examples, the remaining tubes in the stack comprise lattice capillary tubes. However, it should be noted that the birefringence of the drawn fiber depends, for the most part, on the optical and/or physical properties of the capillary tubes at the core gap, and, thus, the corresponding cells in the drawn fiber. Thus, it would be possible to practice the invention using a preform in which the capillary tubes in the outer layers of the preform, assembly have properties that are not uniform, or that am different from the properties of the lattice capillary cells at the core boundary.

Figure 9:
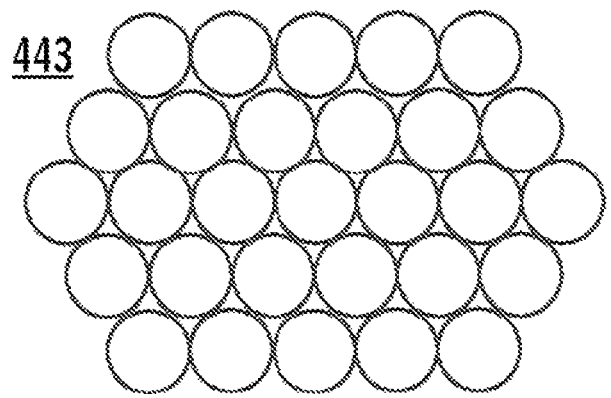
FIG. 9 is a diagram of a portion of an exemplary preform assembly, in which a core gap and a first layer of capillary tubes at the core gap boundary are formed through the omission of a contiguous plurality of capillary tubes.
Figure 9:
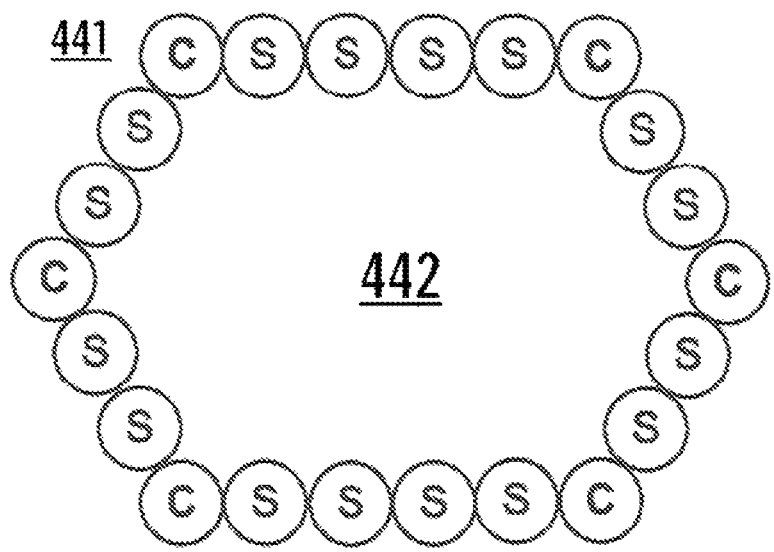

For the purposes of this section, there are defined "corner" and "side" positions for the layer of capillary tubes at the core gap boundary. FIG. 9 is a diagram depicting a portion of an exemplary preform assembly 440, comprising a plurality of capillary tubes 441 in which there has been formed a core gap 442 through the omission of a continuous group of 29 capillary cells 443. Core gap 442 has an elongated hexagonal shape that approximates an oblong circle in the drawn fiber.

It will be seen that each capillary tube in the first layer of capillary tubes abuts to other cells in the first layer. Thus, as used herein, "corner" and "side" positions are defined as follows: if a first-layer cell and its two adjacent cells form a straight line, it is in a "side" position, and all side-position cells in this same line can be collectively referred to as a "side." If a first-layer cell and its two adjacent cells do not form a straight line, it is in a "corner" position. In FIG. 9, each corner position is marked with an upper-case "C" and each side position is marked with an upper case "S."

Figure 10A:
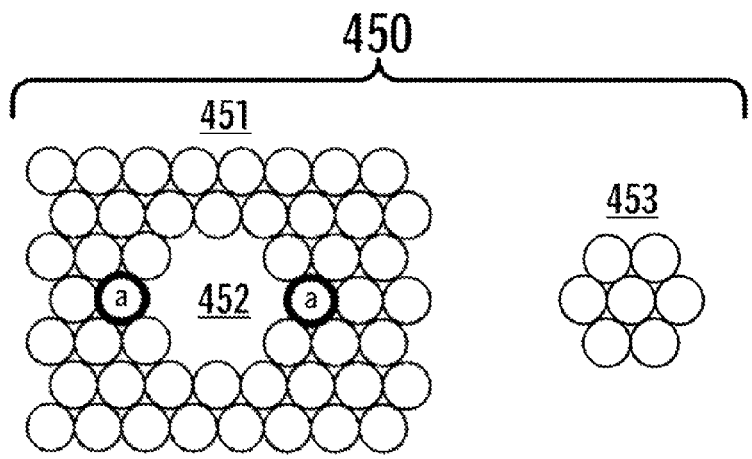
FIGS. 10A-10F show a series of diagrams of exemplary combinations of core size, core shape, and defect placement in a preform assembly.
Figure 10B:
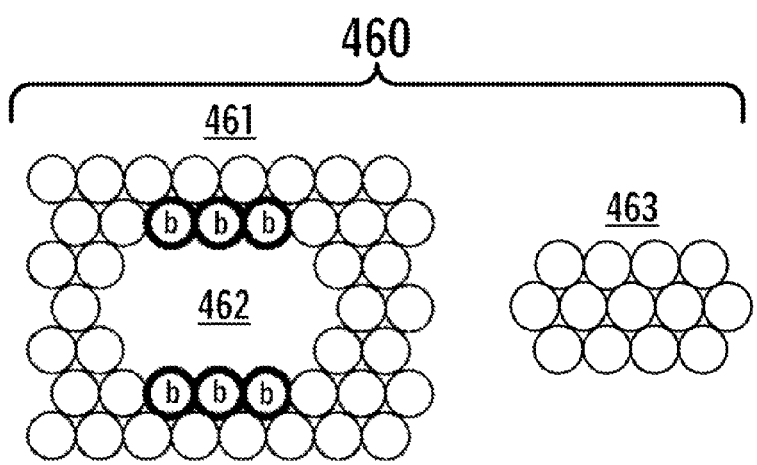
Figure 10C:
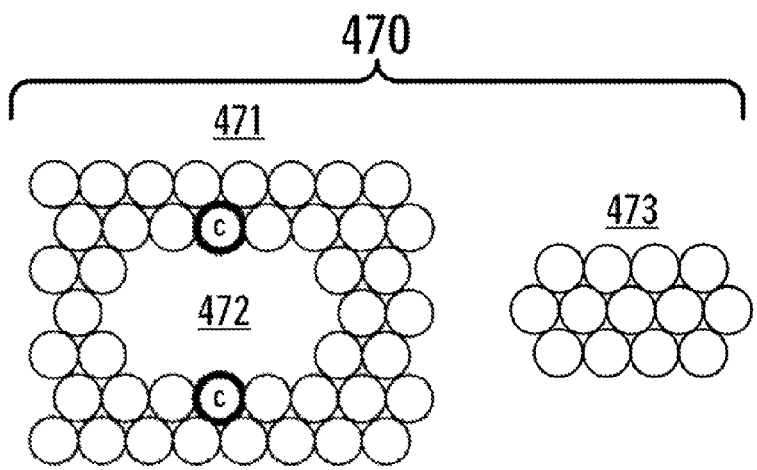
Figure 10D:
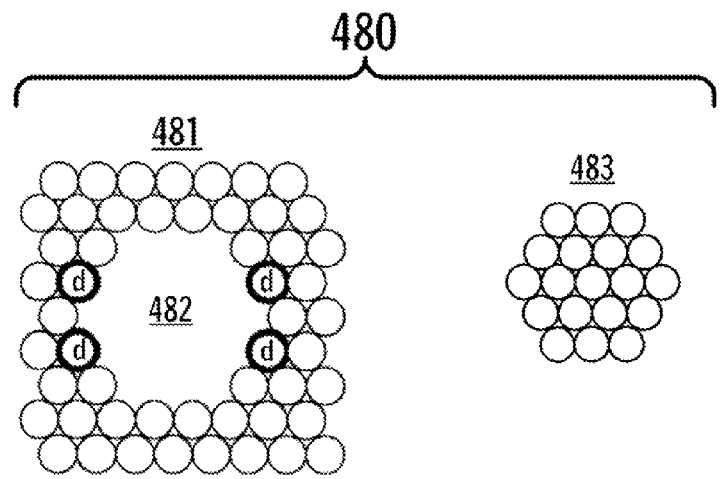
Figure 10E:
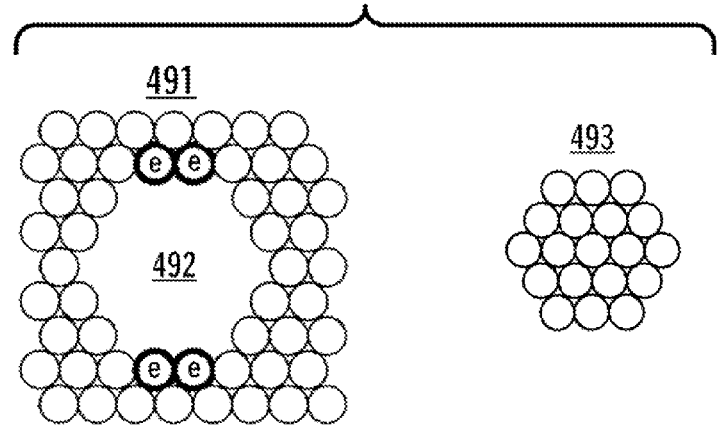

FIGS. 10A-10F are a series of diagrams of exemplary combinations of core size, core shape, and defect placement in a preform assembly. It is noted that the configurations shown in FIGS. 10D and 10E are similar to the configurations shown in FIGS. 7B and 7C, discussed above. It will further be noted that although the present structures are described with respect to preform assemblies, the present description also applies to fibers drawn from the depicted preform assemblies.

FIG. 10A shows a preform assembly 450, comprising a plurality of capillary tubes 451, in which there is formed a core gap 452 through the omission of a 7-cell group of contiguous capillary tubes 453. In preform assembly 450, two defect capillary tubes, marked with a lowercase "a" are positioned at opposing corner positions.

FIG. 10B shows a preform assembly 460, comprising a plurality of capillary tubes 462, in which there is formed a core gap 462 through the omission of a 13-cell group of contiguous capillary tubes 463. In preform assembly 460, six defect capillary tubes, marked with a lowercase "b" are positioned on the long sides of the oblong core.

FIG. 10C shows a preform assembly 470, comprising a plurality of capillary tubes 471, in which there is formed a core gap 472 through the omission of a 13-cell group of contiguous capillary tubes 473. In preform assembly 450, two defect capillary tubes, marked with a lowercase "c" are centered on the long sides of the oblong core.

FIG. 10D shows a preform assembly 480, comprising a plurality of capillary tubes 481, in which there is formed a core gap 482 through the omission of a 19-cell group of contiguous capillary tubes 483. In preform assembly 480, four defect capillary tubes, marked with a lowercase "d" are located at positions adjacent to two opposing corner positions.

FIG. 10E shows a preform assembly 490, comprising a plurality of capillary tubes 491, in which there is formed a core gap 492 through the omission of a 19-cell group of contiguous capillary tubes 493. In preform assembly 490, four defect capillary tubes, marked with a lowercase "e" are positioned at opposing corner positions.

Figure 10F:
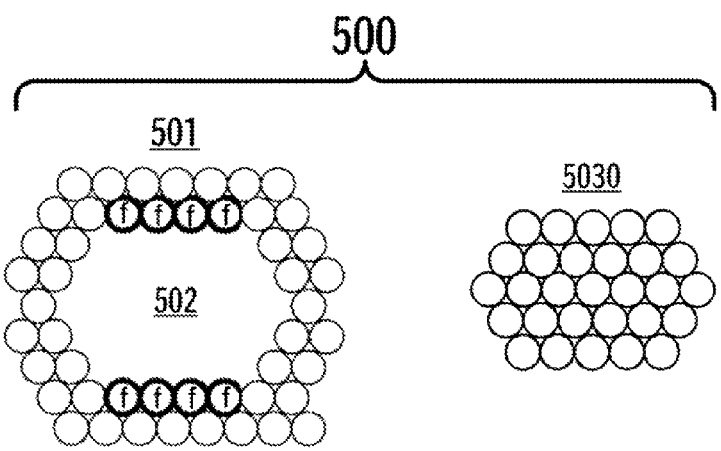

FIG. 10F shows a preform assembly 500, comprising a plurality of capillary tubes 501, in which there is formed a core gap 502 through the omission of a 29-cell group of contiguous capillary tubes 503. In preform assembly 500, eight defect capillary tubes, marked with a lowercase "f" are positioned at opposing corner positions.

Of the above examples, the ones shown in FIGS. 10B, 10C, and 10F belong to a general favorable class, characterized by:

(1) an oblong core
(2) defects positioned on opposite long sides of the core, and
(3) wherein the defects are placed with reflection symmetry with respect to both the long axis and the short axis of the oblong core.

5.53 Ranges of Defect "Strength"

In the exemplary geometries shown in FIGS. 10A-10F, a suitable defect "strength" may be provided using the techniques discussed above.

Thus, in a practice of the invention employing the geometries shown in FIGS. 10A-10F, the defect capillary tubes are tubes having a cross sectional solid area in the range of 1.1 to 2.0 times the cross sectional solid area of the lattice capillary tubes.

According to another practice of the invention, the defect cells in the fiber have a hole width that is 10% to 50% smaller than that of the lattice cells.

6. Other Designs

Figure 11:
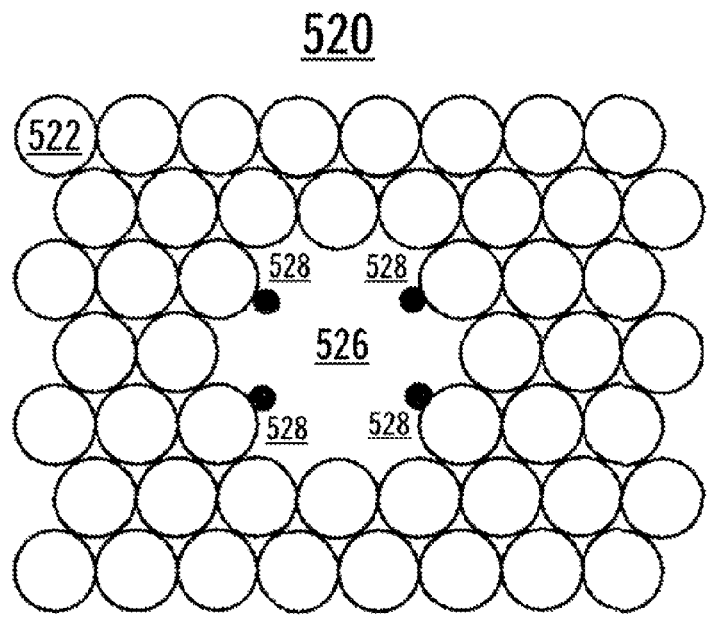
FIGS. 11-13 are cross section diagrams of preform assemblies illustrating alternative ways of obtaining at least some of the advantages of other preform, assemblies described herein.
Figure 12:
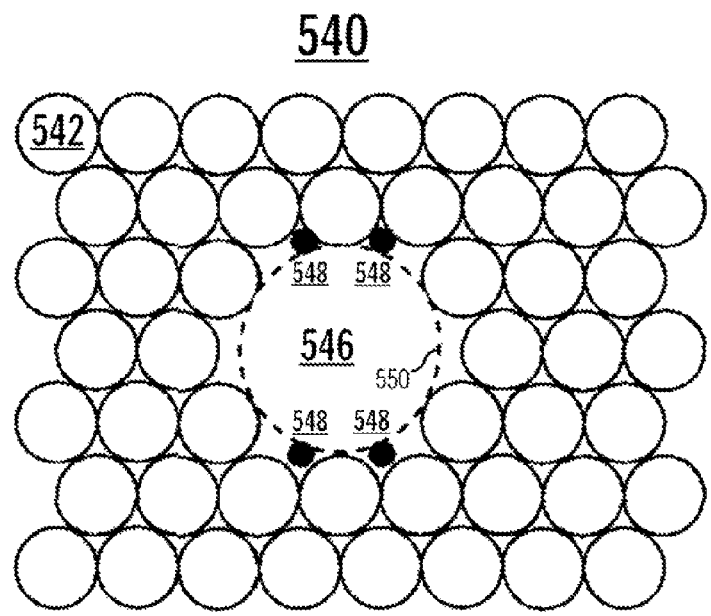

FIGS. 11 and 12 are diagrams illustrating other possible improvements over the prior art.

In FIG. 11, preform assembly 520 is assembled from capillary tubes 522. Solid defect rods 528 are attached directly to the lattice capillary tubes 522 at the boundary of core gap 526, thus eliminating the need for a core tube, and the potentially undesirable change in core-web thickness that often results from using the core tube.

In FIG. 12, preform assembly 540 is fabricated from capillary tubes 542. Defect rods 548 are close-packed with the lattice capillary tubes 542 at the periphery of gap 546. A core tube 550, shown using a dashed line, is provided to hold the defect rods 548 imposition. Further, the core tube 550 can be introduced for support in such a way that it is not actually incorporated into the fiber during draw. For example, the support core tube 550 may not extend the full length of the preform. Alternatively, it may be selectively etched or omitted before draw.

Figure 13:
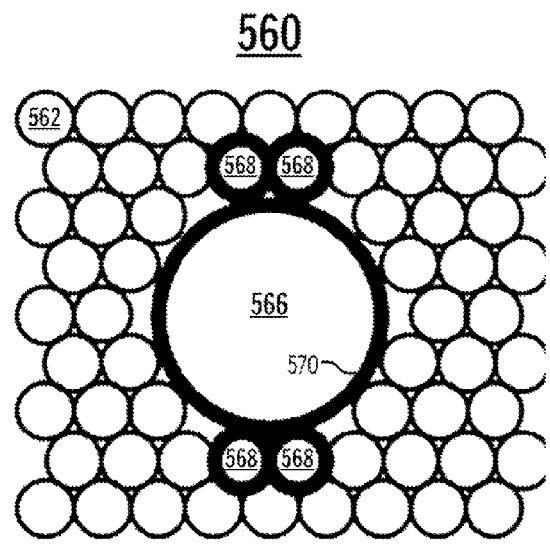

In FIG. 13, it is shown in preform assembly 560 fabricated from capillary tubes 562 that an asymmetric pattern of defect capillary tubes 568 can be used at the periphery of gap 566 along with a core tube 570 where the core tube 570 is incorporated into the fiber and changes the core web thickness. It is understood that while detailed examples focus on the case without a core tube, the basic principles apply to designs with a core tube.

7. Experimental Confirmation

Figure 14:
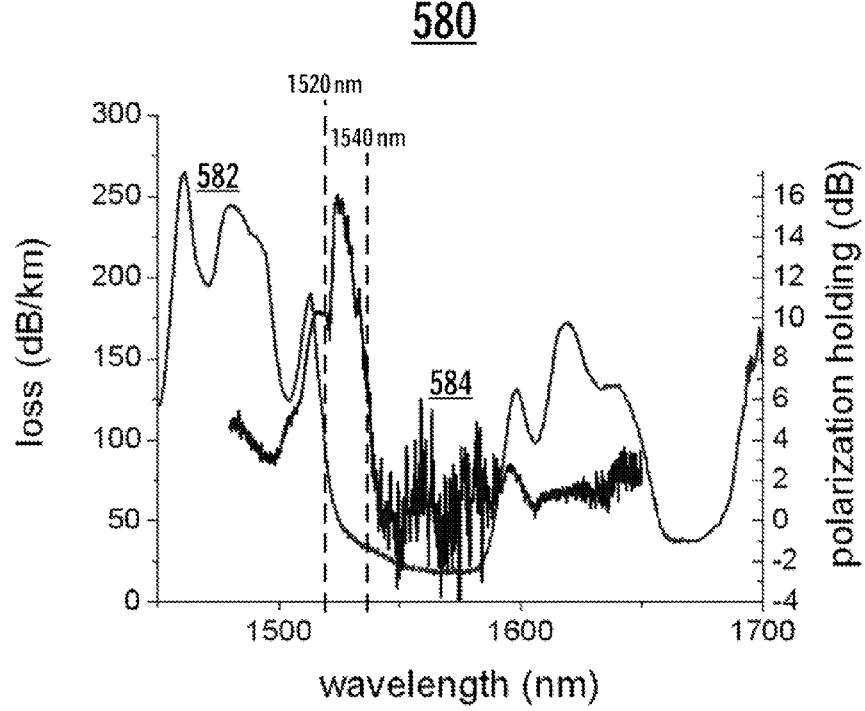
FIG. 14 is a graph illustrating the relationships between loss and wavelength, and between polarization holding and wavelength, for an exemplary fiber according to the present invention.

A series of experiments were conducted to confirm the above numerical simulations. Prototypes of the preform assemblies depicted in FIGS. 7B and 7C were fabricated. Measurements confirmed that the fibers drawn from these assemblies had wavelength ranges of low-loss, polarization-maintaining performance. FIG. 14 is an exemplary graph 580 of preliminary measurement data, in which trace 582 shows the relationship between loss and wavelength, and in which trace 584 shows the relationship between polarization holding and wavelength. Graph 580 indicates a low-loss and polarization-holding window between, approximately, 1520 nm and 1560 nm.

8. General Technique

Figure 15:
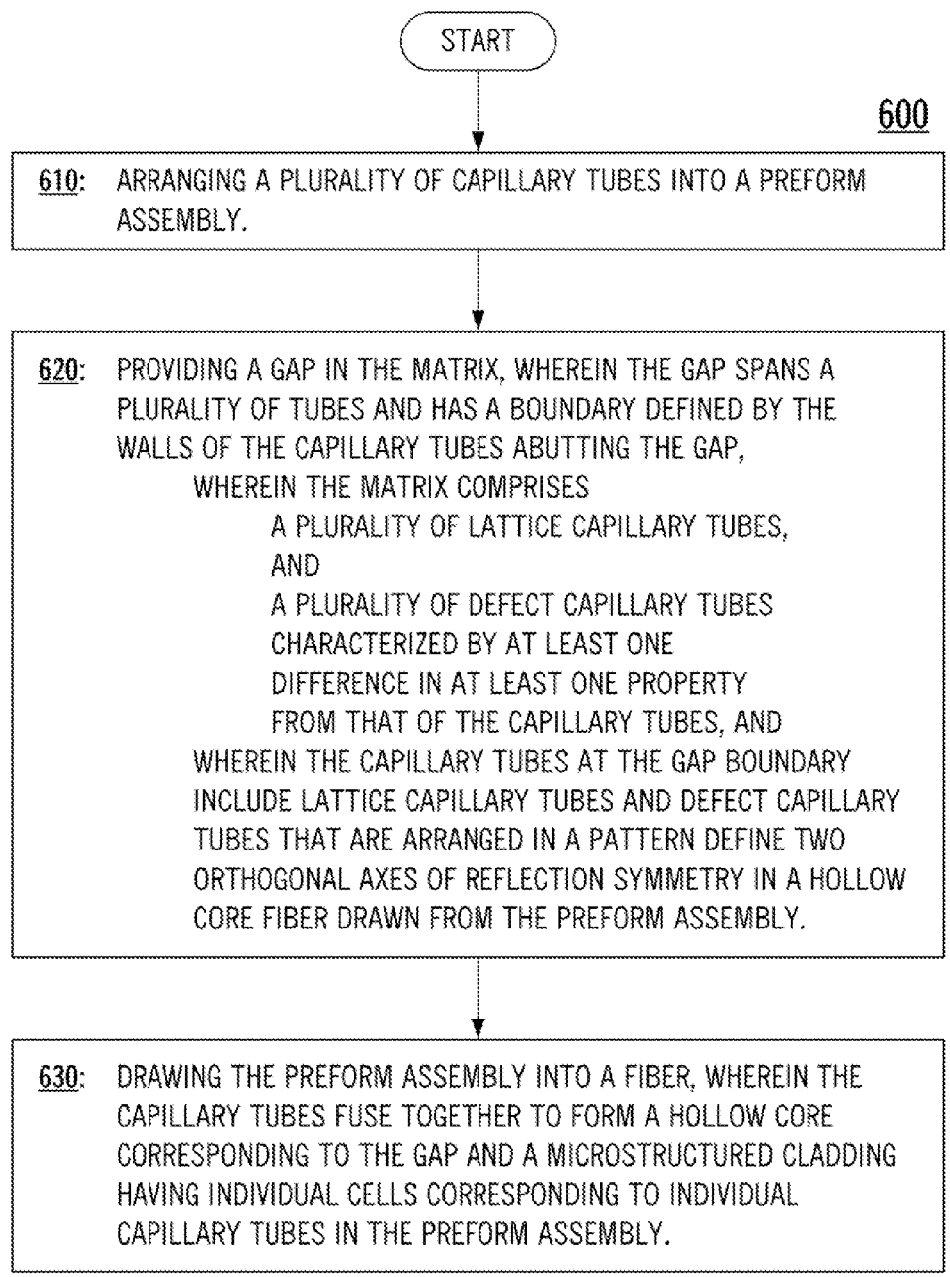
FIG. 15 is a flowchart of a general technique according to the present invention.

FIG. 15 shows a flowchart of a general technique 600, according to various aspects and practices of the invention described above, for constructing a preform assembly for fabricating a birefringent hollow-core fiber.

Technique 600 comprises the following steps:

610: Arranging a plurality of capillary tubes into a preform assembly.

620: Providing a core gap in the matrix, wherein the core gap spans a plurality of tubes and has a boundary defined by the interface between the core gap and the remaking assembly,
wherein the matrix comprises
a plurality of lattice capillary tubes, and
a plurality of defect capillary tubes characterized by at least one difference in at least one property from that of the capillary tubes, and
wherein the capillary tubes at the core gap boundary include lattice capillary tubes and defect capillary tubes that are arranged in a pattern define two orthogonal axes of reflection symmetry in a hollow core fiber drawn from the preform assembly.

630: Drawing the preform assembly into a fiber, wherein the capillary tubes fuse together to form a hollow core corresponding to the core gap and a microstructured cladding having individual cells corresponding to individual capillary tubes in the preform assembly.

9. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A method for fabricating a birefringent hollow core fiber comprising the steps of:
arranging a plurality of capillary tubes into a preform assembly;
providing a core gap in the matrix, wherein the core gap spans a plurality of tubes and has a boundary defined by the interface of the core gap with the remaining assembly,
wherein the matrix comprises
a plurality of lattice capillary tubes, and
a plurality of defect capillary tubes characterized by at least one difference in at least one property from that of the capillary tubes, and
wherein the capillary tubes at the core gap boundary include lattice capillary tubes and defect capillary tubes that are arranged in a pattern defining two orthogonal axes of reflection symmetry in a hollow core fiber drawn from the preform assembly; and drawing the preform assembly into a fiber, wherein the assembly fuses together to form a hollow core corresponding to the core gap and a microstructured cladding having individual cells corresponding to individual capillary tubes in the preform assembly, wherein the defect capillary tubes are selected to have a difference in cross sectional solid area compared with that of the lattice capillary tubes.

2. The method of claim 1, wherein the defect capillary tubes are selected to have a cross sectional solid area that is in the range of 1.1 to 2.0 times the cross sectional area of the lattice capillary tubes.

3. The method of claim 1, wherein the defect capillary tubes are selected such that their wall thicknesses satisfy a relationship $$\frac{(1 - AFF_{defect})}{(1 - AFF_{lattice})} = 1.1 \text{ to } 2.0,$$

where $AFF_{defect}$ is the proportion by volume of air to optical material in a defect capillary tube and $AFF_{lattice}$ is the proportion by volume of air to optical material in a lattice capillary tube.

4. A method for fabricating a birefringent hollow core fiber comprising the steps of:

arranging a plurality of capillary tubes into a preform assembly;

providing a core gap in the matrix, wherein the core gap spans a plurality of tubes and has a boundary defined by the interface of the core gap with the remaining assembly, wherein the matrix comprises a plurality of lattice capillary tubes, and a plurality of defect capillary tubes characterized by at least one difference in at least one property from that of the capillary tubes, and wherein the capillary tubes at the core gap boundary include lattice capillary tubes and defect capillary tubes that are arranged in a pattern defining two orthogonal axes of reflection symmetry in a hollow core fiber drawn from the preform assembly; and drawing the preform assembly into a fiber, wherein the assembly fuses together to form a hollow core corresponding to the core gap and a microstructured cladding having individual cells corresponding to individual capillary tubes in the preform assembly, wherein cells of the fiber corresponding to defect capillary tubes are selected to have a difference in hole width compared with cells of the fiber corresponding to lattice capillary tubes.

5. The method of claim 4, wherein the cells of the fiber corresponding to defect capillary tubes are characterized by having a hole width that is in the range of 1.0 percent to 50 percent smaller than the hole width of cells of the fiber corresponding to the lattice capillary tubes.

6. The method of claim 4, wherein the defect capillary tubes are selected so that their wall thicknesses satisfy a relationship $$\frac{(1 - AFF_{defect})}{(1 - AFF_{lattice})} = 1.2 \text{ to } 1.5,$$

where $AFF_{defect}$ is the proportion by volume of air to optical material in a defect capillary tube and $AFF_{lattice}$ is the proportion by volume of air to optical material in a lattice capillary tube.

7. A method for fabricating a birefringent hollow core fiber comprising the steps of:

arranging a plurality of capillary tubes into a preform assembly;

providing a core gap in the matrix, wherein the core gap spans a plurality of tubes and has a boundary defined by the interface of the core gap with the remaining assembly, wherein the matrix comprises a plurality of lattice capillary tubes, and a plurality of defect capillary tubes characterized by at least one difference in at least one property from that of the capillary tubes, and wherein the capillary tubes at the core gap boundary include lattice capillary tubes and defect capillary tubes that are arranged in a pattern defining two orthogonal axes of reflection symmetry in a hollow core fiber drawn from the preform assembly; and drawing the preform assembly into a fiber, wherein the assembly fuses together to form a hollow core corresponding to the core gap and a microstructured cladding having individual cells corresponding to individual capillary tubes in the preform assembly, wherein the core region has an oblong-shaped cross section profile with defect capillary tubes positioned on opposite long sides of the core, and wherein the defect capillary tubes are placed with reflection symmetry on both the long axis and the short axis of the oblong core.

8. The method of claim 7, comprising a 13-cell core gap with six defect capillary tubes on the long sides of the oblong core.

9. The method of claim 7, comprising a 13-cell core gap with two defect capillary tubes centered on the long sides of the oblong core.

10. The method of claim 7, comprising a 29-cell core gap with eight defect capillary tubes on opposite long sides of the core.

* * * * *